(12) United States Patent
Choi et al.

(10) Patent No.: US 7,791,294 B2
(45) Date of Patent: Sep. 7, 2010

(54) STARTING CONTROL APPARATUS AND METHOD FOR MOTOR

(75) Inventors: Jae-Hak Choi, Seoul (KR); Sung-Ho Lee, Gyeonggi-Do (KR); Jin-Soo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 12/090,136

(22) PCT Filed: Apr. 26, 2007

(86) PCT No.: PCT/KR2007/002051

§ 371 (c)(1),
(2), (4) Date: Apr. 14, 2008

(87) PCT Pub. No.: WO2007/126251

PCT Pub. Date: Nov. 8, 2007

(65) Prior Publication Data
US 2008/0309281 A1 Dec. 18, 2008

(30) Foreign Application Priority Data
May 2, 2006 (KR) .................... 10-2006-0039678

(51) Int. Cl.
*H02P 25/00* (2006.01)
(52) U.S. Cl. .................... 318/400.41; 318/727
(58) Field of Classification Search .................. 318/439, 318/400.41, 727, 773, 780, 790, 766, 753; 327/286
See application file for complete search history.

(56) References Cited

U.S. PATENT DOCUMENTS

| 4,968,907 A | * | 11/1990 | Pepper | ........................ 327/286 |
| 5,574,342 A | | 11/1996 | Okamoto | |
| 6,841,967 B2 | | 1/2005 | Kim et al. | |

FOREIGN PATENT DOCUMENTS

| JP | 56-12874 | 2/1981 |
| JP | 07-322676 | 12/1995 |
| KR | 10-2006-0024970 | 3/2006 |

OTHER PUBLICATIONS

Chinese Office Action dated Mar. 26, 2010.

* cited by examiner

*Primary Examiner*—Karen Masih
(74) *Attorney, Agent, or Firm*—Ked & Associates LLP

(57) ABSTRACT

An exciting coil of a motor is formed to be controlled by using an analog timer, to thus control an excitation control circuit of a motor control apparatus, whereby an excitation control circuit which excites the exciting coil of a motor control apparatus can be simplified and complexity can be reduced by simplifying a circuit construction of an excitation controller. The apparatus includes an auxiliary winding (sub-coil) and a main winding (main coil), and an exciting device electrically connected with the auxiliary winding and the main winding, determines an excitation application time and an excitation time and generates an excitation current according to the determined excitation application time and the excitation time.

19 Claims, 2 Drawing Sheets

STARTING CONTROL APPARATUS AND METHOD FOR MOTOR

BACKGROUND OF THE INVENTION

1. Field of the Invention

The present invention relates to a motor and, more particularly, to an apparatus and method for controlling starting of a motor capable of exciting an exciting coil by using an analog timer.

2. Description of Related Art

In general, in a motor used for a refrigerator, two exciter poles and an exciting coil are separately installed in a stator of a single-phase induction motor.

In the motor used for the refrigerator, two excitor polls and an exciting coil are separately installed at the stator in the single-phase induction motor including a core, a main winding (main coil) and an auxiliary winding (sub-coil).

A rotor of the motor used for the refrigerator includes a magnetic material that facilitates magnetizing and demagnetizing.

An excitation control circuit of the motor used for the refrigerator is a circuit that controls the exciting coil in order to magnetize the magnetic material.

The excitation control circuit includes a feedback coil, a capacitor, a speed response switch and an external controller.

FIG. 1 is schematic view showing the structure of the motor used for the refrigerator according to the related art, which includes a stator 20 and a rotor 40 having a magnetic material.

Here, the operation of the apparatus for controlling the motor of the refrigerator according to the related art will now described.

First, the control apparatus controls such that power is applied to the main winding and the auxiliary winding of the stator 20 of the motor, according to which the rotor 40 is rotated by the power applied to the main winding and the auxiliary winding.

Next, when the rotor 40 reaches a certain speed (synchronous speed 75% to 80%), the exciting coil is excited to magnetize the magnetic material 30 to the rotor 40.

The apparatus for controlling the motor used for the refrigerator as described above is discriminated from an electronic control apparatus that controls an operation of the refrigerator.

Thus, the motor control apparatus and the electronic control apparatus of the refrigerator, each including a complicated controller circuit, increase complexity in constructing a system of the refrigerator.

SUMMARY OF THE INVENTION

Therefore, an object of the present invention is to provide an apparatus and method for controlling starting of a motor capable of simplifying an excitation control circuit that excites an exciting coil of a motor control apparatus and reducing complexity by simplifying a circuit construction of an excitation controller such that the exciting coil is controlled by using an analog timer to thus control the excitation control circuit.

To achieve these and other advantages and in accordance with the purpose of the present invention, as embodied and broadly described herein, there is provided an apparatus for controlling starting of a motor including: an auxiliary winding (sub-coil) and a main winding (main coil); and an exciting unit which is electrically connected with the auxiliary winding and the main winding, determines an excitation application time and an excitation time, and generates an excitation current according to the determined excitation application time and the excitation time.

Here, the exciting unit includes: a main contact that allows power to be supplied to a timer; an auxiliary contact that allows power to be supplied to an exciting coil; and a timer that controls switching of the main contact and the auxiliary contact to allow power supply to the exciting coil to be cut off or to be supplied.

To achieve the above object, there is also provided a method for controlling starting of a motor including: a first step of turning on a timer of a main contact 'a' during a certain time period; and a second step of turning on a timer of an auxiliary contact 'a' and a timer of an auxiliary contact 'b', after the timer of the main contact 'a' is operated for a certain time period, in order to supply power to an exciting coil for a certain time period.

To achieve the above object, there is also provided a method for controlling starting of a motor including: a first step of operating a timer of a main contact 'a' during a pre-set operation time; and a second step of operating a timer of an auxiliary contact 'a' and a timer of an auxiliary contact 'b' during the pre-set time period to supply power to an exciting coil during a certain time period, after the timer of the main contact 'a' is operated during the pre-set operation time.

DEATAILED DESCRIPTION

An apparatus and method for controlling starting of a motor capable of simplifying an excitation control circuit that excites an exciting coil of a motor control apparatus and reducing complexity by simplifying a circuit construction of an excitation controller such that the exciting coil is controlled by using an analog timer to thus control the excitation control circuit, according to the exemplary embodiment of the present invention will now be described with reference to FIGS. 2 to 4.

By including a magnetic material that can be magnetized in a rotor with a bar conductor, the motor can be operated as an inductor motor until speed of the rotor reaches a synchronous speed of a rotation magnetic field, and can be applicable to an excitation motor that magnetizes the magnetic material to reach the synchronous speed of the rotation magnetic field.

Figure 1:
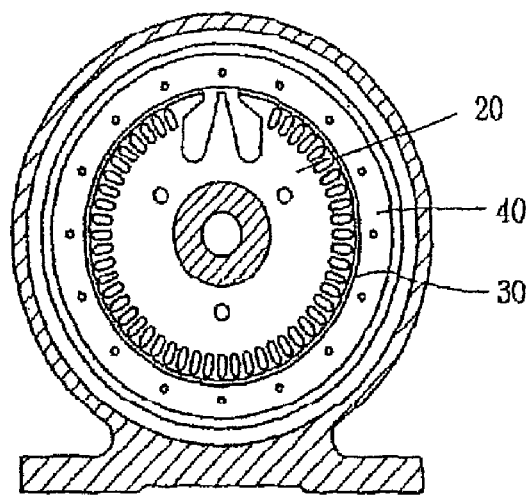
FIG. 1 is a schematic view showing the structure of a motor of a refrigerator according to the related art.
Figure 2:
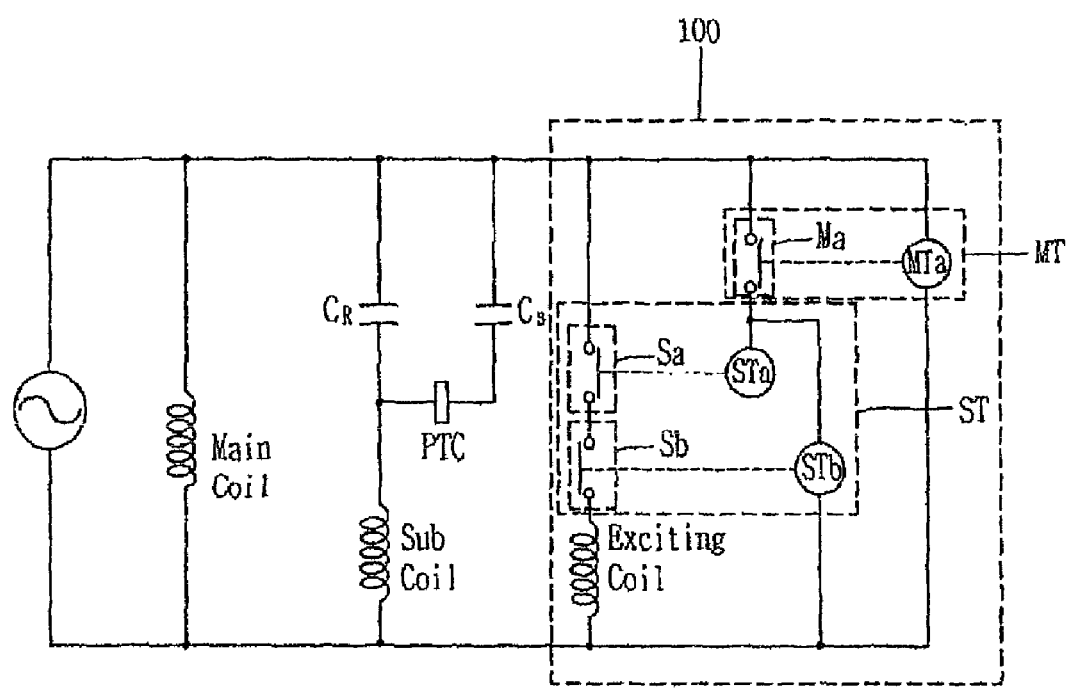
FIG. 2 is a circuit diagram showing the construction of an apparatus for controlling starting of a motor according to an exemplary embodiment of the present invention.

FIG. 2 is a circuit diagram showing the construction of an apparatus for controlling starting of a motor according to an exemplary embodiment of the present invention.

As shown in FIG. 2, it includes a main coil, a sub-coil, a starting capacitor Cs, an operation capacitor Cr, and an exciting unit 100.

In order to start the rotor of the self-magnetizing motor, the starting capacitor Cs applies a current with a fast phase to the sub-coil, and accordingly, the rotor is started by a magnetic field generated from the sub-coil and an induction current.

The operation capacitor Cr applies a current with a phase slower by 90° than the current flowing at the sub-coil, and accordingly, a rotation magnetic field is generated from the stator by the current flowing at the main coil, and thus, the rotor is rotated upon receiving power continuously.

The exciting unit 100 applies a strong current through the exciting coil only when it magnetizes the magnetic material.

Here, the exciting unit 100 includes a timer that cuts off power supply to the exciting coil or allows power to be provided to the exciting coil.

The timer includes a main timer (MT) that controls excitation application time, and an auxiliary timer (sub-timer) (ST) that determines an excitation time for supplying power to the exciting coil.

The main timer MT includes a main contact 'a' (Ma) that supplies power to the auxiliary timer ST and a main timer 'a' (MTa) that controls an excitation application time by controlling ON/OFF of the main contact 'a' (Ma).

The auxiliary timer ST includes an auxiliary contact 'a' (Sa) and an auxiliary contact 'b' (Sb) that allow power to be supplied to the exciting coil, and includes an auxiliary timer 'a' (STa) and an auxiliary timer 'b' (STb) that determine an excitation time by using a time difference of when the auxiliary contact 'a' (Sa) and the auxiliary contact 'b' (Sb) respectively become conductive.

Here, when the main timer MT and the auxiliary timer ST are operated for a certain time, they automatically return to their original state.

Namely, the apparatus for controlling starting of the motor determines the excitation application time and the excitation time by using the analog timers MT and ST.

The operation of the present invention will now be described.

First, in order to start the rotor of the self-magnetizing motor, the starting capacitor Cs applies a current with a fast phase to the sub-coil, and accordingly, the rotor is started by the magnetic field and an induction current generated from the sub-coil.

Next, the operation capacitor Cr applies a current with a phase slower by 90° than that of the current flowing at the sub-coil to the main coil, and accordingly, the stator generates a rotation magnetic field by the current flowing at the main coil, so the rotor can be rotated upon receiving power continuously.

Figure 3:
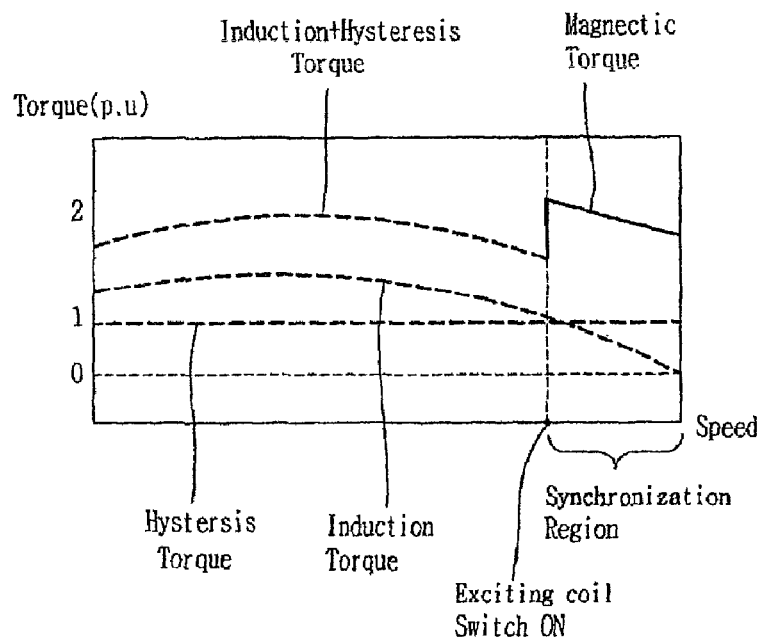
FIG. 3 is a view showing a speed-torque curved line of the motor with respect to the apparatus for controlling starting of the motor according to the exemplary embodiment of the present invention.
Figure 4:
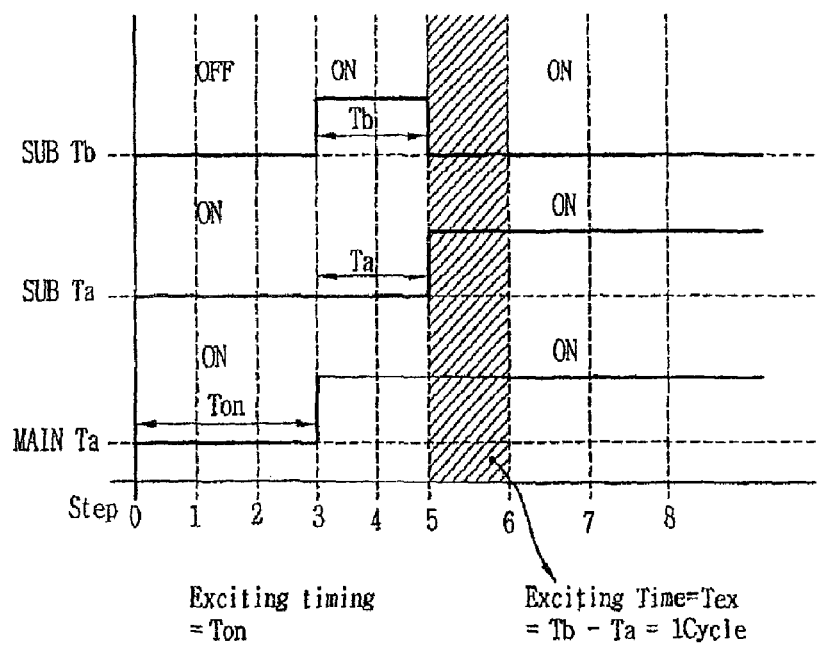
FIG. 4 is a graph showing operation timings of timers with respect to the apparatus for controlling starting of the motor according to the exemplary embodiment of the present invention.

In this case, because the rotor body is made of a ferromagnetic substance of high permeability, the magnetic field generated by the main coil and the sub-coil magnetizes the rotor, and accordingly, the rotor is rotated upon receiving a hysteresis torque (H) by a hysteresis effect as shown in FIG. 3.

Namely, as shown in FIG. 3, the rotor receives the hysteresis torque (H) and an induction torque (I) so as to be rotated.

If the speed of the rotor becomes the same as a synchronous speed (3,600 rpm) of the rotation magnetic field, the rotor is always slower than the synchronous speed of the rotation magnetic field. Namely, a slip phenomenon occurs.

At this time, when a strong current is applied to the exciting coil, a strong magnetic flux generated by the exciting coil is transferred to a magnetic material surrounding an outer circumferential surface of the rotor to magnetize the magnetic material.

Then, the magnetic material is magnetized to become a permanent magnet which is rotated along the rotation magnetic field which has been already generated at the stator.

In this case, although the rotation speed of the rotor is gradually increased to be the same as the synchronous speed of the rotation magnetic field, the permanent magnet can be continuously rotated along the rotation magnetic field, so the rotary force of the rotor will not be reduced.

That is, the self-magnetizing motor according to the present invention undergoes two-stage rotation process: It is rotated by the induction torque (I) and the hysteresis torque (H) at the low speed stage, and then, when it enters the high speed stage (synchronous speed: 3,600 rpm), the exciting coil magnetizes the magnetic material so that the self-magnetizing motor can be rotated by the magnetization torque (P).

In this case, because the strong current needs to be applied through the exciting coil only at the instant the magnetic material is magnetized, a heat loss that may be possibly generated at the coil when the strong current is continuously applied can be reduced and thus the motor efficiency can be increased.

Here, in the present invention, the strong current is applied through the exciting coil only at the instant when the magnetic material is magnetized by using the exciting unit 100.

The operation of the exciting unit 100 will now be described with reference to FIG. 4.

First, when power is applied, the timer (MTa) of the main contact 'a' (Ma) is operated, and when a certain time (Ton) lapses after the main contact 'a' (Ma) is operated, the main contact 'a' (Ma) enters a closed state from an opened stated.

When the main contact 'a' (Ma) is in the closed state, the timer (STa) of the auxiliary contact 'a' (Sa) and the timer (STb) of the auxiliary contact 'b' (Sb) are operated.

When the operation time of the timer (STa) of the auxiliary contact 'a' (Sa) reaches a certain time (Ta), the auxiliary contact 'a' (Sa) enters the closed state from the opened state.

Simultaneously when the timer (STb) of the auxiliary contact 'b' (Sb) is operated, the auxiliary contact 'b' (Sb) enters the closed state from the opened state, and when the operation time of the timer (STb) of the auxiliary contact 'b' (Sb) reaches a certain time (Tb), the auxiliary contact 'b' (Sb) enters the opened state from the closed state.

Accordingly, the excitation application time for applying power to the exciting coil is 'Ton', and the excitation time is Tex=Tb–Ta–1 Cycle'.

The excitation application time and the excitation time will be described in detail as follows.

First, when power is applied at steps 0 to 3 and the main timer (MT) is operated to be turned on, the main contact 'a' (Ma) is in the opened state during a certain time (Ton).

Next, when the certain time (Ton) lapses at steps 3 to 5, the main contact 'a' (Ma) is closed.

In addition, the auxiliary contacts 'a' and 'b' (Sa and Sb) are operated so that the auxiliary timer 'a' (STa) is turned on and the auxiliary contact 'a' (Sa) is maintained to be in the opened state while the auxiliary timer 'b' (STb) is turned on and the auxiliary contact 'b' (Sb) is maintained to be in the closed state.

Thereafter, when the auxiliary timer 'a' (STa) is turned on and the auxiliary contact 'a' (Sa) is closed at steps 5 and 6, an excitation current is applied to the exciting coil through the auxiliary contact 'b' (Sb) during one cycle.

And then, when the auxiliary timer 'b' (STb) is turned on at steps 6 to 8, the auxiliary contact 'b' (Sb) is changed from the closed state to the opened state, and accordingly, the excitation current applied to the exciting coil is cut off.

Here, the main contact 'a' (Ma), the auxiliary contact 'a' (Sa) and the auxiliary contact 'b' (Sb) are formed of a relay(s) or bi-directionally conductive power semiconductor.

Namely, in the present invention, without having to a high-priced electronic control device, the excitation application time and the excitation time for supplying power to the exciting coil can be determined by using the analog timer.

As so far described, the apparatus and method for controlling starting of the motor according to the present invention has such an advantage that because exciting coil of the motor is controlled by using the analog timer to control the excitation control circuit of the motor controlling apparatus, the excitation control circuit for exciting the exciting coil can be simplified, and in addition, because the excitation control circuit for exciting the exciting coil and the component construction of the excitation controller are simplified, the complexity can be reduced.

The invention claimed is:

1. An apparatus for controlling starting of a motor, the apparatus comprising:
   a sub coil and a main coil; and
   an exciting device electrically connected with the sub-coil and the main coil, that determines an excitation application time and an excitation time and generates an excitation current according to the determined excitation application time and the excitation time, wherein the exciting device comprises:
      a main contact that allows power to be supplied to a timer;
      an auxiliary contact that allows power to be supplied to an exciting coil; and
      the timer, which controls switching of the main contact and the auxiliary contact to allow a power supply to the exciting coil to be cut off or to be supplied.

2. The apparatus of claim 1, wherein the timer comprises:
   a main timer that controls the excitation application time; and
   an auxiliary timer that determines the excitation time for supplying power to the exciting coil.

3. The apparatus of claim 2, wherein the main timer comprises the main contact, which allows the power to be supplied to the auxiliary timer, and wherein the main timer controls the excitation application time by controlling switching ON and OFF of the main contact.

4. The apparatus of claim 2, wherein the auxiliary timer comprises:
   a first auxiliary contact and a second auxiliary contact that allow the power to be supplied to the exciting coil; and
   a first auxiliary timer and a second auxiliary timer that determine the excitation time by using a time difference of when the first auxiliary contact and the second auxiliary contact respectively become conductive.

5. The apparatus of claim 2, wherein when the main timer is operated for a certain time period, the main timer automatically returns to its original state.

6. The apparatus of claim 2, wherein when the auxiliary timer is operated for a certain time period, the auxiliary timer automatically returns to its original state.

7. The apparatus of claim 1, wherein the timer comprises:
   the main contact, which allows the power to be supplied to the auxiliary timer;
   a main timer that controls the excitation application time for controlling conducting of the main contact;
   a first auxiliary contact and a second auxiliary contact that allow the power to be supplied to the exciting coil; and
   an auxiliary timer that determines the excitation time by using a time difference between the first auxiliary contact and the second auxiliary contact.

8. The apparatus of claim 7, wherein the main contact is formed of a relay or a bi-directionally conductive power semiconductor.

9. The apparatus of claim 7, wherein the first auxiliary contact is formed of a relay or a bi-directionally conductive power semiconductor.

10. The apparatus of claim 7, wherein the second auxiliary contact is formed of a relay or a bi-directionally conductive power semiconductor.

11. A method for controlling starting of a motor, the method comprising:
    turning on a main timer of a main contact during a certain time period; and
    turning on a first auxiliary timer of a first auxiliary contact and a second auxiliary timer of a second auxiliary contact, after the main timer of the main contact is operated for a certain time period, in order to supply power to an exciting coil for a certain time period.

12. The method of claim 11, wherein the supplying power to the exciting coil for a certain time period comprises simultaneously operating the first and second timers of the first and second auxiliary contacts for a certain time period.

13. The method of claim 11, further comprising:
    previously setting the operation time of the main timer of the main contact and the second auxiliary timer of the second auxiliary contact.

14. The method of claim 11, wherein the main contact is formed of a relay or a bi-directionally conductive power semiconductor.

15. The method of claim 11, wherein the first auxiliary contact is formed of a relay or a bi-directionally conductive power semiconductor.

16. A method for controlling starting of a motor, the method comprising:
    operating a main timer of a main contact during a pre-set operation time; and
    operating a first auxiliary timer of a first auxiliary contact and a second auxiliary timer of a second auxiliary contact during the pre-set time period to supply power to an exciting coil during a certain time period, after the main timer of the main contact is operated during the pre-set operation time.

17. The method of claim 16, wherein the supplying power to the exciting coil for a certain time period comprises simultaneously operating the first and second timers of the respective first and second auxiliary contacts for a certain time period.

18. The method of claim 16, wherein the main contact is formed of a relay or a bi-directionally conductive power semiconductor.

19. The method of claim 16, wherein the first auxiliary contact is formed of a relay or a bi-directionally conductive power semiconductor.

* * * * *